United States Patent
Sakurada

(10) Patent No.: US 9,944,326 B2
(45) Date of Patent: Apr. 17, 2018

(54) VEHICLE BODY SIDE PORTION STRUCTURE

(71) Applicant: HONDA MOTOR CO., LTD., Tokyo (JP)

(72) Inventor: Chihiro Sakurada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/297,602

(22) Filed: Oct. 19, 2016

(65) Prior Publication Data

US 2017/0113730 A1    Apr. 27, 2017

(30) Foreign Application Priority Data

Oct. 22, 2015  (JP) ................................. 2015-208370

(51) Int. Cl.
*B60J 7/00* (2006.01)
*B62D 21/15* (2006.01)
(Continued)

(52) U.S. Cl.
CPC ......... *B62D 21/157* (2013.01); *B62D 25/025* (2013.01); *B62D 25/2027* (2013.01); *B62D 25/2036* (2013.01); *B60Y 2306/01* (2013.01)

(58) Field of Classification Search
CPC .... B61D 7/00; H01M 10/0525; H01M 4/133; H01M 4/364; H01M 4/366; B01D 35/027;
(Continued)

(56) References Cited

U.S. PATENT DOCUMENTS 7,644,978 B2 *  1/2010  Tosaka ................. B62D 21/157
                                                296/187.08
8,052,205 B2 * 11/2011  Matsuyama ....... B62D 25/2036
                                                296/193.07
(Continued)

FOREIGN PATENT DOCUMENTS

JP    7-187019 A    7/1995
JP    2000-016348 A    1/2000
(Continued)

OTHER PUBLICATIONS

Office Action dated Jun. 27, 2017, issued in counterpart Japanese Application No. 2015-208370, with English machine translation. (6 pages).

*Primary Examiner* — Kiran B Patel
(74) *Attorney, Agent, or Firm* — Westerman, Hattori, Daniels & Adrian, LLP

(57) ABSTRACT

A vehicle body side portion structure includes a side sill that, at a side portion of a vehicle body, extends in a front-rear direction of the vehicle body; a rear side floor panel that is joined to a rear portion of a floor panel of the vehicle body and extends towards a rear of the vehicle body, and that extends in a vehicle width direction and is joined to the side sill; and a rear middle floor panel that is provided at an inner side of the rear side floor panel in the vehicle width direction and covers an energy storage. A vertical wall portion is provided at an outer side of the rear middle floor panel in the vehicle width direction. The rear side floor panel is joined to an outer side of the vertical wall portion in the vehicle width direction and includes a weakened portion.

11 Claims, 4 Drawing Sheets

(51) Int. Cl.
    *B62D 25/20*     (2006.01)
    *B62D 25/02*     (2006.01)

(58) Field of Classification Search
    CPC .......... B29C 45/1704; H01L 21/67326; H01L 21/67383; H01L 2924/0002
    USPC .................................................. 296/187.12
    See application file for complete search history.

(56) References Cited

U.S. PATENT DOCUMENTS

| | | | | |
|---|---|---|---|---|
| 8,128,154 | B2* | 3/2012 | Egawa | B62D 25/2036 296/187.12 |
| 8,282,154 | B2* | 10/2012 | Maruyama | B62D 25/02 296/193.05 |
| 8,646,833 | B2* | 2/2014 | Fujii | B62D 21/157 296/187.08 |
| 8,939,246 | B2* | 1/2015 | Yamaguchi | B60K 1/04 180/311 |
| 8,985,681 | B2* | 3/2015 | Fujii | B62D 25/2036 296/204 |
| 9,061,708 | B2* | 6/2015 | Sugiyama | B62D 25/16 |
| 9,381,952 | B2* | 7/2016 | Furusaki | B62D 21/152 |
| 9,545,952 | B2* | 1/2017 | Sakaguchi | B62D 21/157 |
| 2004/0113462 | A1* | 6/2004 | Winter | B62D 21/155 296/203.02 |
| 2009/0085375 | A1* | 4/2009 | Fonseka | B62D 21/157 296/187.12 |
| 2010/0237659 | A1* | 9/2010 | Ishigame | B62D 21/157 296/204 |
| 2013/0088045 | A1* | 4/2013 | Charbonneau | B62D 21/157 296/187.12 |
| 2013/0264840 | A1* | 10/2013 | Izumi | B62D 25/025 296/187.12 |
| 2014/0001790 | A1* | 1/2014 | Zischke | B62D 25/2018 296/187.03 |
| 2016/0068196 | A1* | 3/2016 | Saeki | B62D 21/157 296/187.08 |

FOREIGN PATENT DOCUMENTS

| | | |
|---|---|---|
| JP | 2004-090856 A | 3/2004 |
| JP | 2013-124023 A | 6/2013 |
| JP | 2014-000837 A | 1/2014 |

* cited by examiner

VEHICLE BODY SIDE PORTION STRUCTURE

CROSS REFERENCES TO RELATED APPLICATIONS

The present application claims priority under 35 U.S.C. § 119 to Japanese Patent Application No. 2015-208370, filed Oct. 22, 2015, entitled "Vehicle Body Side Portion Structure." The contents of this application are incorporated herein by reference in their entirety.

TECHNICAL FIELD

The present disclosure relates to a vehicle body side portion structure. In particular, the present disclosure relates to a vehicle body side portion structure located around a rear side floor panel.

BACKGROUND

For example, Japanese Unexamined Patent Application Publication No. 07-187019 (Patent Literature 1 (PTL 1)) (Claim 1, FIG. 1) discloses a vehicle body side portion structure including an extension member that includes a connecting portion and an enlargement portion. The connecting portion is connected to a rear end portion of a front side member. The enlargement portion is formed continuously with the connecting portion and extends towards the rear of the vehicle body. In addition, the enlargement portion becomes wider in a vehicle width direction and is joined to a side sill. The extension member is joined to a region extending from a rear end portion of the front side member to a dash lower panel and to a floor panel. A plurality of reinforcing beads extending in a front-rear direction of the vehicle body are formed in the enlargement-portion substantially in parallel in the vehicle width direction. In PTL 1, it is possible to disperse and transmit a collision input occurring at the time of a head-on collision to the floor panel.

Although, in the vehicle body side portion structure described in the aforementioned PTL 1, it is possible to disperse and transmit a collision input occurring at the time of a head-on collision to the floor panel, a collision load that is generated in a side collision of a vehicle cannot be properly absorbed. In particular, in a vehicle in which an energy storage, such as a fuel tank or a battery, is disposed at a central portion of the vehicle body, a vehicle body side portion structure that reduces a collision load that is generated in a side collision of a vehicle is desired.

SUMMARY

In view of the aforementioned point, the present application describes, for example, a vehicle body side portion structure that allows a collision load that is generated in a side collision of a vehicle to be properly absorbed, and that allows influences of the collision load on an energy storage to be suppressed.

To this end, according to a first aspect of an embodiment, there is provided a vehicle body side portion structure including a side sill that, at a side portion of a vehicle body, extends in a front-rear direction of the vehicle body; a rear side floor panel that is joined to a rear portion of a floor panel of the vehicle body and extends towards a rear of the vehicle body, and that extends in a vehicle width direction and is joined to the side sill; and a rear middle floor panel that is provided at an inner side of the rear side floor panel in the vehicle width direction and that covers an energy storage. A vertical wall portion is provided at an outer side of the rear middle floor panel in the vehicle width direction. The rear side floor panel is joined to an outer side of the vertical wall portion in the vehicle width direction and includes a weakened portion.

According to such a structure, since the rear side floor panel includes the weakened portion, it is possible to easily deform the rear side floor panel when a vehicle is subjected to a collision load that is generated in a side collision of the vehicle to ensure a collision stroke. Since the inner side of the rear side floor panel in the vehicle width direction is joined to the vertical wall portion at the rear middle floor panel, it is possible to suppress extension of deformation of the rear side floor panel to an inner side of the vertical wall, portion (the rear middle floor panel). Therefore, it is possible to properly absorb the collision load that is generated in the side collision of the vehicle, and to suppress influences of the collision load on the energy storage.

When a rear side frame that extends in the front-rear direction of the vehicle body is disposed at a lower portion of the rear side floor panel, it is desirable that a part of the rear side frame be connected to the vertical wall portion.

According to such a structure, it is possible to increase the strength at a side of the energy storage by the rear side frame.

It is desirable that the rear side frame include a bottom portion and a side portion that rises upward from the bottom portion, and that a lower portion of the vertical wall portion be joined to an outer side of the side portion in the vehicle width direction.

According to such a structure, when a collision load that is generated in a side collision of a vehicle extends to the rear side frame, it is possible to suppress pushing by the rear side frame against the vertical wall portion to the inner aids in the vehicle width direction. Therefore, it is possible to suppress influences of the collision load on the energy storage.

When a rear panel is joined to a rear portion of the rear side floor panel, and extends so as to be inclined upward towards the rear of the vehicle body, it is desirable that the rear panel include a panel bead portion that extends in the front-rear direction of the vehicle body.

According to such a structure, it is possible to, by deformation of the rear panel, properly absorb a collision load that is generated in a side collision of a vehicle, and to suppress influences of the collision load on the energy storage.

It is desirable that the weakened portion be a bead portion of the rear side floor panel that extends in at least one of the front-rear direction of the vehicle body and an up-down direction of the vehicle body.

According to such a structure, when the rear side floor panel is subjected to a collision load that is generated in a side collision of a vehicle, the rear side floor panel is easily deformed, and influences of the collision load on the energy storage are suppressed.

When a bulkhead member that extends in an up-down direction of the vehicle body is joined to a surface of the side sill that is opposite to a surface of the side sill to which the rear side floor panel is joined, it is desirable that the rear side floor panel and the bulkhead member foe disposed so as to oppose each other in the vehicle width direction.

According to such a structure, it is possible to increase the strength of the side sill by the bulkhead member. Therefore, in the case of a relatively small collision load that is generated in a side collision of a vehicle, it is possible to absorb the collision load by the side sill to suppress transmission of the collision load to the rear side floor panel. In addition, in the case of an excessive collision load, it is possible to absorb a collision stroke by deforming the rear side floor panel.

The rear side floor panel and the bulkhead member oppose each other in the vehicle width direction. Therefore, in the case of an excessive collision load, the collision load is properly transmitted to the rear side floor panel. Consequently, it is possible to properly accelerate the deformation of the rear side floor panel.

According to the present disclosure, for example, it is possible to provide a vehicle body side portion structure that allows a collision load that is generated in a side collision of a vehicle to foe properly absorbed, and that allows influences of the collision load on an energy storage to be suppressed.

BRIEF DESCRIPTION OF THE DRAWINGS

The advantages of the disclosure will become apparent in the following description taken in conjunction with the following drawings.

DETAILED DESCRIPTION

Figure 1:
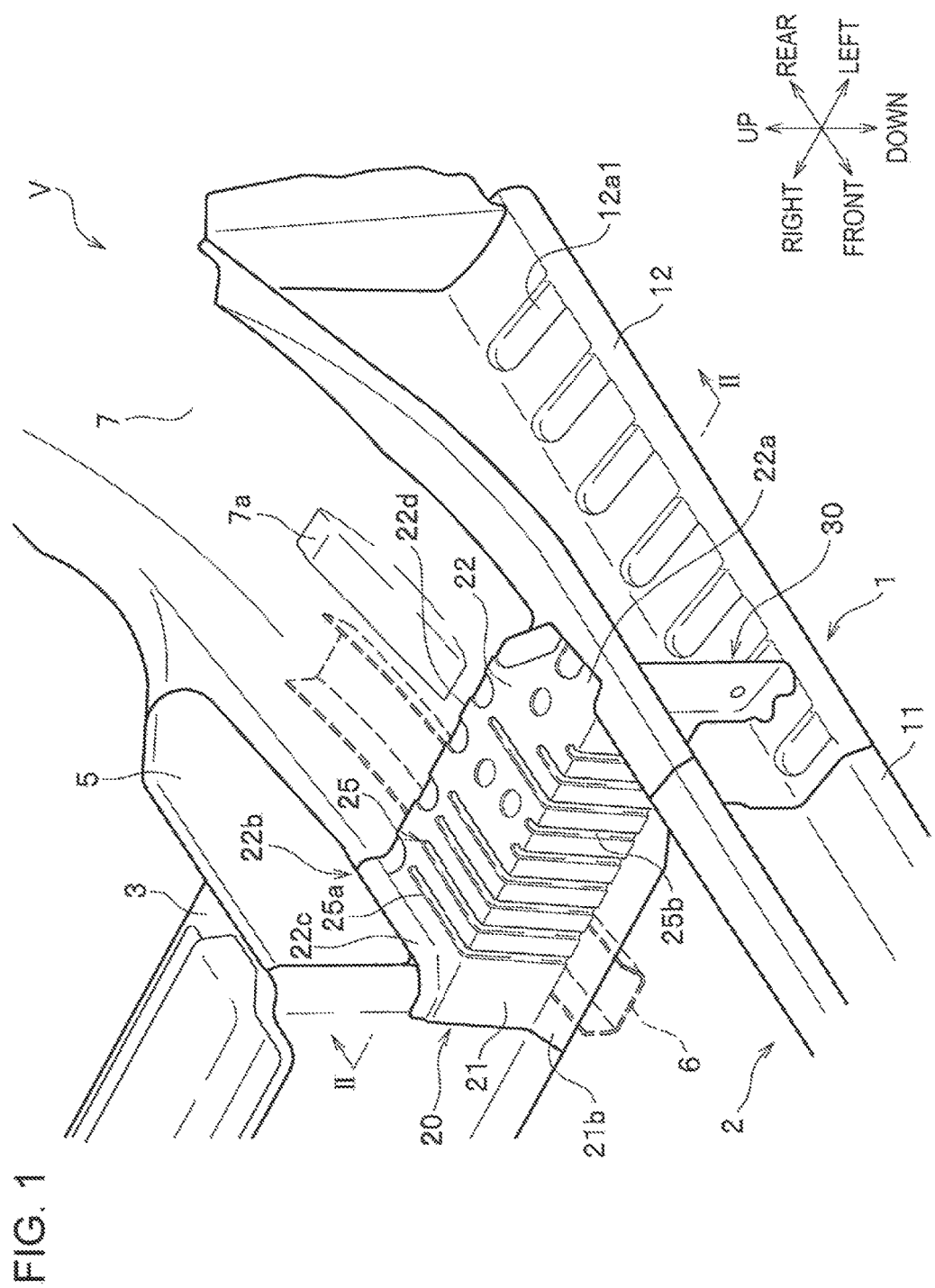
FIG. 1 is a perspective view of a vehicle body side portion structure according to an embodiment when seen from a left front side.

An embodiment of the present disclosure is described in detail with reference to the drawings as appropriate. Corresponding structural components are given the same reference numerals, and the same descriptions are not repeated. Directions are described as being a front direction, a rear direction, a left direction, a right direction, an up direction, or a down direction as seen from a driver. The tens "vehicle width direction" means the same as "left-right direction".

As shown in FIG. 1, an automobile V including a vehicle body side portion structure according to the embodiment primarily includes a side sill 1, a rear side floor panel 20, and a rear middle floor panel 3. At a side portion of a vehicle body, the side sill 1 extends in a front-rear direction of the vehicle body. The rear side floor panel 20 is joined to a rear portion of a floor panel 2 of the vehicle body and extends towards the rear of the vehicle body. In addition, the rear side floor panel 20 extends in the vehicle width direction and is joined to the side sill 1. The rear middle floor panel 3 is provided at an inner side of the rear side floor panel 20 in the vehicle width direction, and covers a fuel tank T (see FIG. 2), which is an energy storage.

Two front seats (not shown) are disposed above the floor panel 2, one on the left and one on the right of the vehicle. Rear seats (not shown) are disposed above the rear side floor panel 20 and the rear middle floor panel 3 (above a rear panel 7).

The left and right sides of the vehicle body side portion structure are substantially symmetrical to each other. Therefore, in the description below, only a left-side structure is described as an example.

As shown in FIG. 1, the side sill 1 forms a side edge portion of the vehicle body, and includes a first side sill 11 and a second side sill 12 that is joined to a rear portion of the first side sill 11. The first side sill 11 is disposed on a side of the floor panel 2. The second side sill 12 is formed continuously with a rear portion of the first side sill 11, and is primarily disposed on a side of the rear side floor panel 20 and on a side of the rear panel 7.

The first side sill 11 and the second side sill 12 may be integrated with each other without being divided from each other.

A side sill outer (not shown) is joined to an outer side of the side sill 1 in the vehicle width direction. Therefore, the side sill 1 has a closed cross section.

Figure 2:
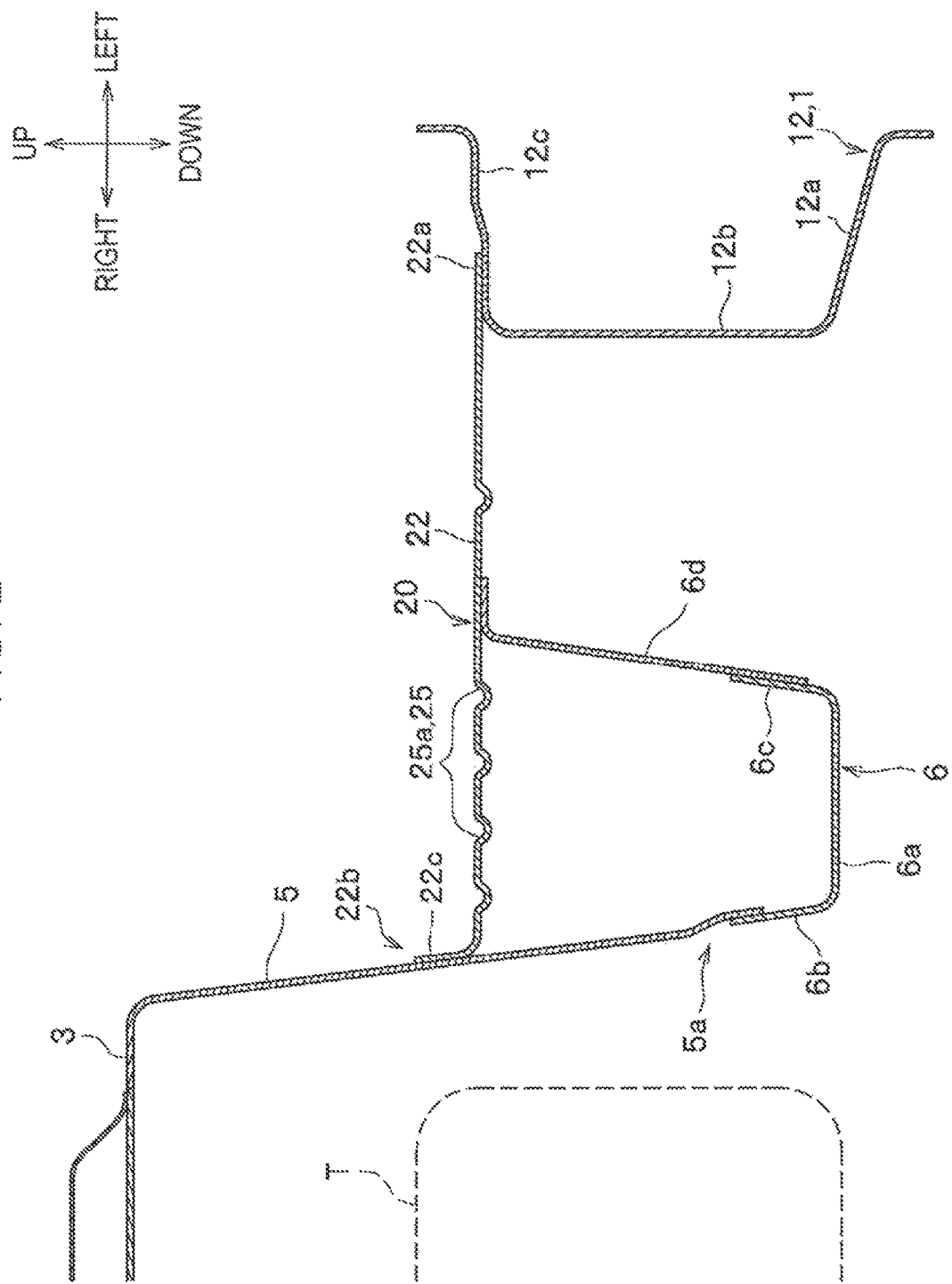
FIG. 2 is an enlarged end view taken along line II-II in FIG. 1.

As shown in FIG. 2, the second side sill 12 has a recessed form in cross section, and includes a lower portion 12a, a side portion 12b that is formed continuously with and that rises from an inner side end portion of the lower portion 12a in the vehicle width direction, and an upper portion 12c that is formed continuously with an upper end portion of the side portion 12b and that extends to an outer side of the upper end portion of the side portion 12b in the vehicle width direction. As shown in FIG. 1, the lower portion 12a has beads 12a1 that extend in the vehicle width direction.

As shown in FIG. 1, a bulkhead member 30 is mounted on an outer side surface of a front portion of the second side sill 12 (that is, a surface of the second side sill 12 that is opposite to a surface thereof to which the rear side floor panel 20 is joined). The bulkhead member 30 has the form of a plate, and is disposed such that its plate surface extends in the vehicle width direction and an up-down direction (see FIG. 5). That is, the bulkhead member 30 is disposed such that a plate end portion faces the outer side in the vehicle width direction.

Figure 5:
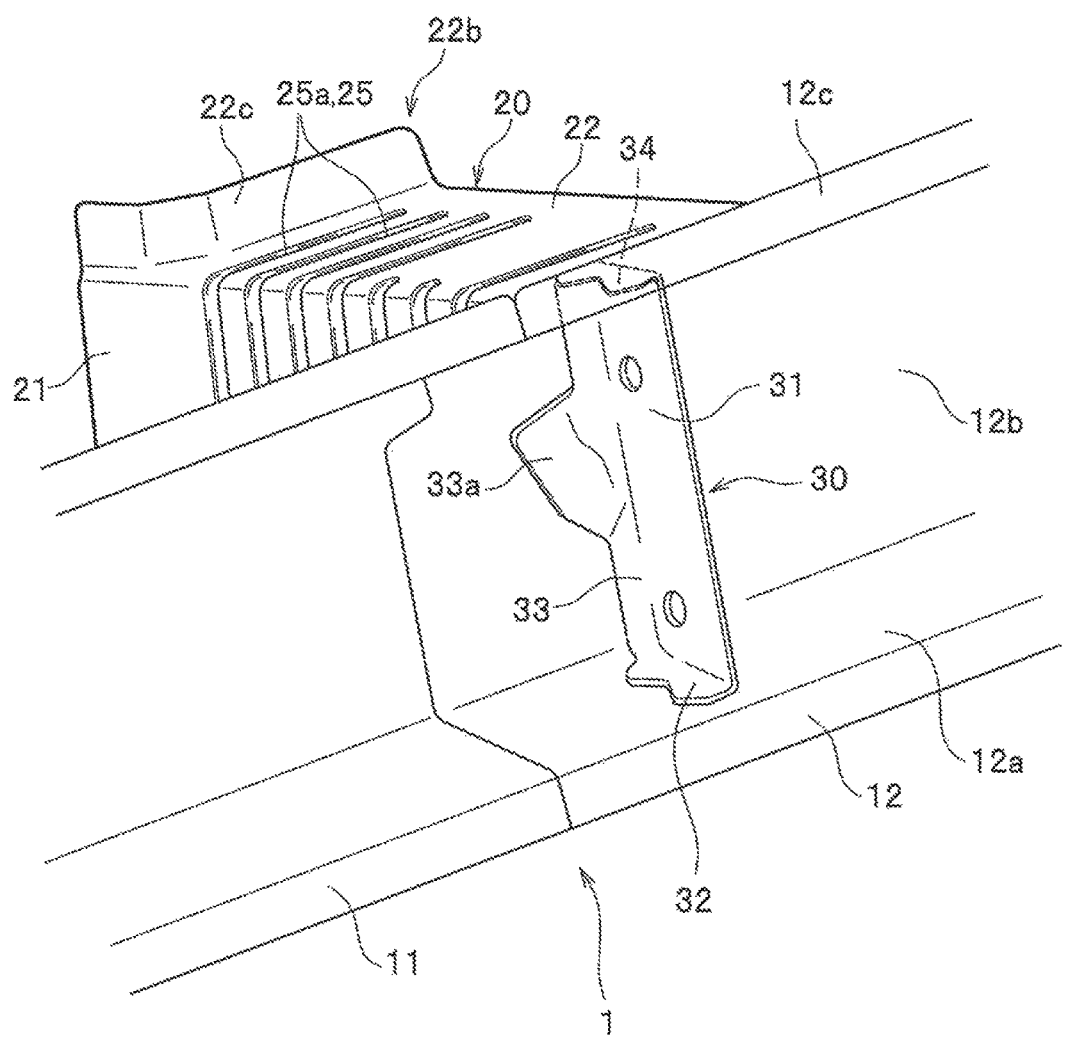
FIG. 5 is an enlarged perspective view showing a state in which the bulkhead member is mounted.

As shown in FIG. 5, the bulkhead member 30 includes a base plate 31, a lower flange 32 that is formed on a lower portion of the base plate 31, a side flange 33 that is formed at an inner side of the base plate 31 in the vehicle width direction, and an upper flange 34 that is formed on an upper portion of the base plate 31. The lower flange 32 is joined to an upper surface of the lower portion 12a of the second side sill 12. The side flange 33 is similarly joined to a side surface of the side portion 12b. The upper flange 34 is similarly joined to a lower surface of the upper portion 12c.

As shown in FIG. 5, an extending piece 33a that extends forwardly is integrated with the side flange 33. Similarly to the side flange 33, the extending piece 33a is welded to the side surface of the side portion 12b of the second side sill 12 and to a vertical plate portion 21c (described later) (see FIG. 3) of the rear side floor panel. 20 such that the extending piece 33a, the side portion 12b, and the vertical plate portion 21c are placed upon each other in three layers.

Figure 4:
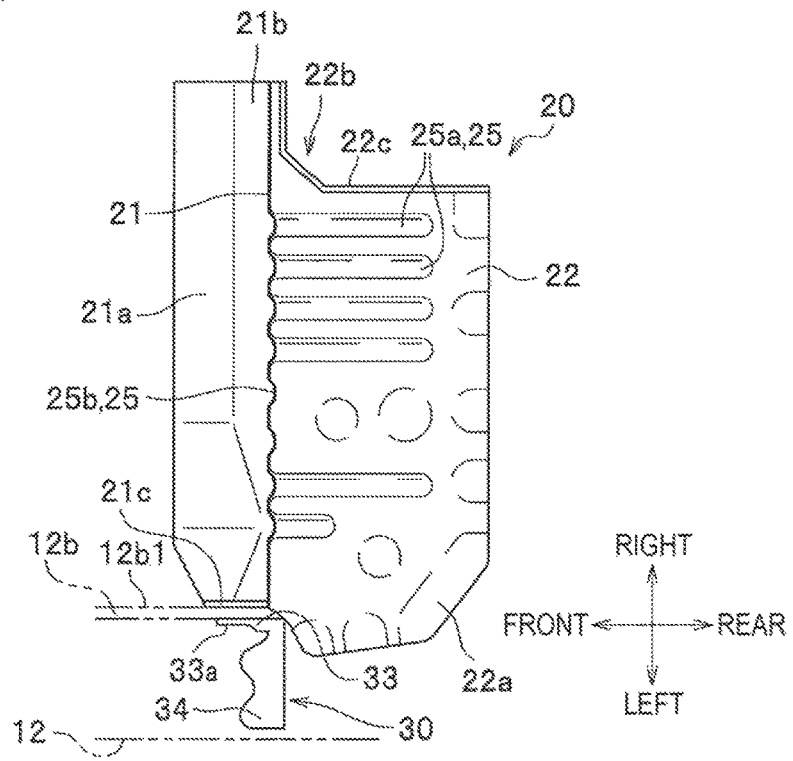
FIG. 4 is a plan view showing a relationship between the position of the rear side floor panel and the position of a bulkhead member at a side sill.

As shown in FIGS. 1, 4, and 5, such bulkhead member 30 is disposed at an outer side of the rear side floor panel 20 in the vehicle width direction. In the embodiment, the rear side floor panel 20 and the bulkhead member 30 are disposed so as to oppose each other with the side portion 12b of the second side sill 12 interposed therebetween in the vehicle width direction (see FIG. 4).

As shown in FIG. 1, the rear side floor panel 20 is disposed between the second side sill 12 and a vertical wall portion 5 provided at the rear middle floor panel 3 (see FIG. 2).

Figure 3:
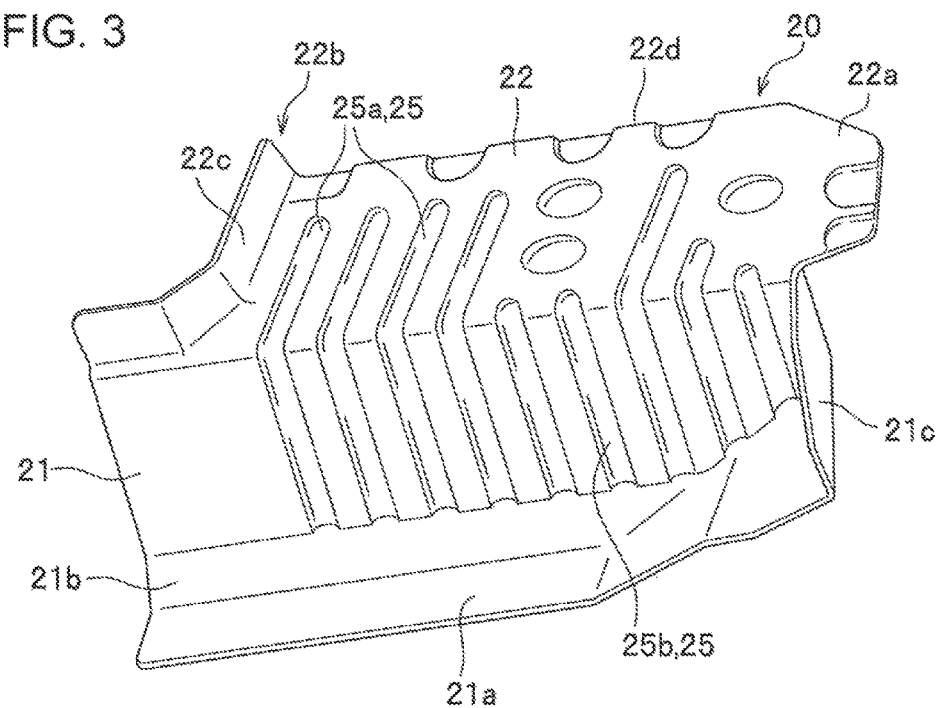
FIG. 3 is a perspective view of a rear side floor panel.

As shown in FIG. 3, the rear side floor panel 20 includes a front plate 21 and an upper plate 22; and is substantially L-shaped in cross section. That is, compared to a flat rear side floor panel, the rear side floor panel 20 has greater strength. The rear side floor panel 20 is made of, for example, a steel plate.

The front plate 21 has a rectangular shape, and is larger in the vehicle width direction than in the up-down direction. As shown in FIG. 1, the front plate 21 extends upward front the rear portion of the floor panel 2. As shown in FIG. 3, a skirt 21a is consecutively formed with a lower edge portion of the front plate 21. The skirt 21a extends towards the front from the lower edge portion of the front plate 21. The skirt 21a is formed at right angles to the front plate 21 with an inclined portion 21b disposed therebetween. A front edge portion of the skirt 21a is joined to the rear portion of the floor panel 2 (see FIG. 1).

The vertical plate portion 21c is integrated with a left edge portion of the front plate 21. As shown in FIG. 4, the vertical plate portion 21c is a portion that is joined to an inner side surface 12b1 of the side portion 12b of the second side sill 12 in the vehicle width direction. The extending piece 33a and the side flange 33 of the bulkhead member 30 oppose the vertical plate portion 21c.

As shown in FIG. 3, the upper plate 22 is consecutively formed with an upper edge portion of the front plate 21. The upper plate 22 has a rectangular shape, and is larger in the vehicle width direction than in the front-rear direction. As shown in FIG. 1, the upper plate 22 extends towards the rear from a rear portion of the front plate 21. A left end portion 22a of the upper plate 22 protrudes to an outer side (left side) from the vertical plate portion 21c of the front plate 21 in the vehicle width direction. As shown in FIG. 1, the left end portion 22a is placed on and is joined to the upper portion 12c of the second side sill 12.

A right end portion 22b of the upper plate 22 is a portion that is joined to an outer surface of the vertical wall portion 5 and an outer surface of a front wall portion of the rear middle floor panel 3. As shown in FIG. 3, the right end portion 22b of the upper plate 22 is cutaway into a shape corresponding to those of the outer surfaces. An edge portion 22c of the right end portion 22b is bent upward into a shape extending along the outer surface of the rear middle floor panel 3 (the vertical wall portion 5).

As shown in FIG. 1, the rear panel 7 is joined to a rear edge portion 22d of the upper plate 22. The rear panel 7 extends so as to be inclined upward towards the rear of the vehicle body. The rear panel 7 includes a panel bead portion 7a that extends in the front-rear direction of the vehicle body and that bulges upward.

As shown in FIG. 3, the front plate 21 and the upper plate 22 include recessed bead portions 25. The recessed bead portions 25 function as weakened portions that are weak with respect to a side collision. The bead portions 25 include first bead portions 25a that extend in the front-rear direction of the vehicle body and the up-down direction of the vehicle body, and second bead portions 25b that extend in the up-down direction of the vehicle body. Each first bead portion 25a is continuously formed on both sides of a ridge line between the front, plate 21 and the upper plate 22 (front edge portion of the front plate 21), and is continuously formed in both the front plate 21 and the upper plate 22. Each second bead portion 25b is only formed in the front plate 21. The first bead portions 25a and the second bead portions 25b are formed at equal intervals in the vehicle width direction.

In this way, since the rear side floor panel 20 is L-shaped in cross section, and includes the recessed bead portions 25, the rear side floor panel 20 has a desired strength in the up-down direction of the vehicle body and in the left-right direction of the vehicle body, and is deformed when it is subjected to a collision load that is generated in a side collision of a vehicle to ensure a collision stroke.

As shown in FIG. 1, a rear side frame 6 that extends in the front-rear direction of the vehicle body is provided below the rear middle floor panel 3. A front portion of the rear side frame 6 extends to a lower portion of the floor panel 2. The rear portion of the floor panel 2 extends to a lower portion of the rear panel 7. As shown in FIG. 2, the rear side frame 6 includes a bottom portion 6a, an inner side wall 6b, and an outer side wail 6c. The inner side wall 6b rises upward from an inner-side edge portion of the bottom portion 6a in the vehicle width direction. The outer side wall 6c rises upward from an outer-side edge portion in the vehicle width direction at a side opposite to the inner side wall 6b. The rear side frame 6 has a recessed form in cross section. A lower portion 5a of the vertical wall portion 5 forms part of the inner side wall 6b of the rear side frame 6. A rear side frame outer 6d is joined to the outer side wall 6c of the rear side frame 6. An upper end portion of the rear side frame outer 6d is joined to a lower surface of the upper plate 22 of the rear side floor panel 20. Therefore, the rear side frame 6 has a closed cross section.

The inner side wall 6b of the rear side frame 6 corresponds to a "side portion" (of the rear side frame 6).

As shown in FIG. 1, the vertical wall portion 5 is provided at an outer side of the rear middle floor panel 3 in the vehicle width direction. The vertical wall portion 5 has the function of reinforcing the rear middle floor panel 3. As shown in FIG. 2, the fuel tank T, which serves as an energy storage, is disposed at an inner side of the vertical wall portion 5 in the vehicle width direction below the rear middle floor panel 3. That is, the fuel tank T is protected by being covered by the rear middle floor panel 3 and the vertical wall portion 5.

In addition to the fuel tank 7, examples of the energy storage include a battery and a hydrogen high-pressure tank.

The right end portion 22b (the edge portion 22c) of the upper plate 22 of the rear side floor panel 20 is joined to an outer side of the vertical wall portion 5 in the vehicle width direction. As shown in FIG. 2, in sectional view, the lower portion 5a of the vertical wall portion 5 extends downward with respect to the rear side floor panel 20, and an end portion of the lower portion 5a of the vertical wall portion 5 extends into an inner side of the inner side wall 6b of the rear side fraise 6 and is joined to an inner surface of the inner side wall 6b (outer side surface of the inner side wall 6b in the vehicle width direction).

Next, an operation in the vehicle body side portion structure having such a structure when a collision load is input to the second side sill 12 is described.

When a collision load is input to the second side sill 12 due to, for example, a side collision, and this collision load is relatively small, the second side sill 12 (the bulkhead member 30) absorbs the collision load, so that transmission of the collision load to the rear side floor panel 20 is suppressed.

When the collision load is excessively large, the collision load transmitted from the second side sill 12 (the bulkhead member 30) to the rear side floor panel 20. Since the rear side floor panel 20 includes the bead portions 25 as weakened portions, a collision stroke is ensured due to deformation of the rear side floor panel 20 via the bead portions 25.

In this case, since the collision load is directly transmitted to the rear side floor panel 20 from the bulkhead member 30 with the second side sill 12 interposed therebetween, it is possible to properly accelerate the deformation of the rear side floor panel 20.

Since the right end portion 22b, which is an inner side portion in the vehicle width direction, of the rear side floor panel 20 is joined to an outer side surface of the rear middle floor panel 3 (the vertical wall portion 5), extension of the deformation of the rear side floor panel 20 to the inner side of the vertical wall portion 5 (the rear middle floor panel 3) is suppressed.

When a collision load is input to the rear panel 7, the rear panel 7 is deformed via the panel bead portion 7a, so that a collision stroke is ensured.

When a collision load extends to the rear side frame 6 due to, for example, the deformation of the rear side floor panel 20 and deformation of the rear panel 7, pushing by the rear side frame 6 against the vertical wall portion 5 towards the inner side in the vehicle width direction is suppressed by a joint structure of the rear side frame 6 with inspect to the vertical wall portion 5.

In the vehicle body side portion structure according to the embodiment described above, since the rear side floor panel 20 includes the weakened portions, the rear side floor panel 20 is easily deformed when the rear side floor panel 20 is subjected to a collision load that is generated in a side collision of a vehicle, so that a collision stroke can be ensured. Since an inner side portion of the rear side floor panel 20 in the vehicle width direction is joined to the vertical wall portion 5 at the rear middle floor panel 3, it is possible to suppress extension of the deformation of the rear side floor panel 20 to the inner side of the vertical wall portion 5 (the rear middle floor panel 3). Therefore, the collision load that is generated in the side collision of the vehicle can be properly absorbed, and influences of the collision load on the fuel tank T are suppressed.

Since the rear side frame 6 is disposed at a lower portion of the rear side floor panel 20, it is possible to increase the strength at a side of the fuel tank T by the rear side frame 6.

The lower portion 5a of the vertical wall portion 5 is joined to the outer side of the inner side wall 6b. of the rear side frame 6 in the vehicle width direction. Therefore, when a collision load that is generated in a side collision of a vehicle extends to the rear side frame 6, pushing by the rear side frame 6 against the vertical wall portion 5 towards the inner side in the vehicle width direction can be suppressed. Consequently, it is possible to suppress influences of the collision load on the fuel tank T.

Since the rear panel 7 that is joined to a rear-portion of the rear side floor panel 20 includes the panel bead portion 7a, it is possible to, by deformation of the rear panel 7, properly absorb a collision load that is generated in a side collision of a vehicle, and to suppress influences of the collision load on the fuel tank T.

Since the rear side floor panel 20 includes the bead portions 25, when the rear side floor panel 20 is subjected to a collision load that is generated in a side collision of a vehicle, the rear side floor panel 20 is easily deformed, and influences of the collision load on the fuel tank T can be suppressed.

Since the bulkhead member 30 is provided at the side sill 1 (the second side sill 12), it is possible to increase the strength of the side sill 1 (the second side sill 12). Therefore, in the case of a relatively small collision load that is generated in a side collision of a vehicle, it is possible to absorb the collision load by the side sill 1 to suppress transmission of the collision load to the rear side floor panel 20. In addition, in the case of an excessive collision load, it is possible to absorb a collision stroke by deforming the rear side floor panel 20.

The bulkhead member 30 opposes the rear side floor panel 20 in the vehicle width direction. Therefore, when the collision load is excessively large, the collision load is properly transmitted to the rear side floor panel 20. This makes it possible to properly accelerate the deformation of the rear side floor panel 20.

Although the vehicle body side portion structure according to the embodiment is described in detail above with reference to the drawings, the present disclosure is not limited thereto. Modifications may be made when appropriate within a scope that does not depart from the gist of the present disclosure.

For example, the left and right sides of the rear side floor panel 20 need not be necessarily symmetrical to each other. In addition, the rear side floor panel 20 may have a structure that does not include the front plate 21 or the upper plate 22.

The bead portions 25 of the rear side floor panel 20 are not limited to those in which each first bead portion 25a is formed on both sides of an edge line. The bead portions 25 may be those in which one portion of the first bead portion 25a and the other portion of the first bead portion 25a are separately formed on the front plate 21 and the upper plate 22, respectively, instead of being formed continuously on respective sides of the edge line.

The bead portions 25 only need to be provided on at least one of the front plate 21 and the upper plate 22. The number of bead portions 25 and the forms of the bead portions 25 may foe set as appropriate.

The material of the rear side floor panel 20 is not limited to a steel plate. The rear side floor panel 20 may be formed from, for example, a carbon-fiber reinforced plastic member.

Although the lower portion 5a of the vertical wall portion 5 is described as being joined to the outer side of the inner side wall 6b of the rear side frame 6 in the vehicle width direction, the present disclosure is not limited thereto. Part, of the rear side frame 6 may be connected to the vertical wall portion 5.

The present disclosure is widely applicable to a vehicle including an energy storage, such as a hybrid vehicle, an electric vehicle, and a fuel-cell vehicle. Although a specific form of embodiment has been described above and illustrated in the accompanying drawings in order to be more clearly understood, the above description is made by way of example and not as limiting the scope of the invention defined by the accompanying claims. The scope of the invention is to he determined by the accompanying claims. Various modifications apparent, to one of ordinary skill in the art could be made without departing from the scope of the invention. The accompanying claims cover such modifications.

What is claimed is:

1. A vehicle body side portion structure comprising:
   a side sill disposed at a side portion of a vehicle body and extending in a front-rear direction of the vehicle body;
   a rear side floor panel that is joined to a rear portion of a floor panel of the vehicle body and extends towards a rear of the vehicle body, and that extends in a vehicle width direction and is joined to the side sill; and
   a rear middle floor panel that is provided at an inner side of the rear side floor panel in the vehicle width direction and that covers an energy storage,
   wherein the rear middle floor panel includes a vertical wall portion provided at an outer side thereof in the vehicle width direction, and
   wherein the rear side floor panel includes a weakened portion and is joined to an outer side of the vertical wall portion in the vehicle width direction.

2. The vehicle body side portion structure according to claim 1, further comprising a rear side frame extending in the front-rear direction of the vehicle body and disposed under the rear side floor panel, and wherein part of the rear side frame is connected to the vertical wall portion.

3. The vehicle body side portion structure according to claim 2, wherein the rear side frame includes a bottom portion and a side portion that rises upward from the bottom portion, and wherein a lower portion of the vertical wall portion is joined to an outer side of the side portion in the vehicle width direction.

4. The vehicle body side portion structure according to claim 1, further comprising a rear panel joined to a rear-portion of the rear side floor panel, and extending so as to be inclined upward towards the rear of the vehicle body, and wherein the rear panel includes a panel bead portion that extends in the front-rear direction of the vehicle body.

5. The vehicle body side portion structure according to claim 1, wherein the weakened portion is a bead portion of the rear side floor panel that extends in at least one of the front-rear direction of the vehicle body and an up-down direction of the vehicle body.

6. The vehicle body side portion structure according to claim 1, further comprising a bulkhead member extending in an up-down direction of the vehicle body and joined to a surface of the side sill that is opposite to a surface of the side sill to which the rear side floor panel is joined, and wherein the rear side floor panel and the bulkhead member are disposed so as to oppose each other in the vehicle width direction.

7. The vehicle body side portion structure according to claim 1, wherein the rear side floor panel is joined to the side sill at an outer end thereof in the vehicle width direction and is joined to the outer side of the vertical wall portion at an inner end thereof in the vehicle width direction, and the rear side floor panel includes the weakened portion in a body portion thereof between the outer-end and the inner end.

8. The vehicle body side portion structure according to claim 2, wherein the rear side frame has a substantially U shape comprising a bottom portion and two side portions that rise upward from the bottom portion, and wherein a lower portion of the vertical wall portion is joined to an outer side surface of one of the two side portions in the vehicle width direction.

9. The vehicle body side portion structure according to claim 8, wherein the vertical wall portion extends upward from an upper end of the one of the two side portions.

10. The vehicle body side portion structure according to claim 1, wherein the rear side floor panel includes a front plate and an upper plate connected to each other via a ridge line interposed therebetween.

11. A vehicle comprising the vehicle body side portion structure according to claim 1.

\* \* \* \* \*